United States Patent
Chae et al.

(10) Patent No.: US 7,310,330 B2
(45) Date of Patent: Dec. 18, 2007

(54) APPARATUS FOR PROVIDING BROADCASTING CHANNEL INFORMATION IN INTERNET PROTOCOL BASED DIGITAL BROADCASTING SYSTEM AND METHOD THEREOF

(75) Inventors: Kyung-Ho Chae, Seoul (KR); Chang-Sup Shim, Seoul (KR); Jun-Ho Koh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 252 days.

(21) Appl. No.: 11/126,741

(22) Filed: May 11, 2005

(65) Prior Publication Data
US 2006/0126597 A1    Jun. 15, 2006

(30) Foreign Application Priority Data
Dec. 11, 2004    (KR) ...................... 10-2004-0104658

(51) Int. Cl.
H04L 12/66    (2006.01)
(52) U.S. Cl. ...................... 370/352; 370/401; 725/110; 725/109; 725/112
(58) Field of Classification Search ............... 370/352, 370/354, 355, 356, 401; 725/110, 109, 112
See application file for complete search history.

(56) References Cited

U.S. PATENT DOCUMENTS

| | | | |
|---|---|---|---|
| 6,189,039 B1 * | 2/2001 | Harvey et al. .............. 709/232 |
| 6,446,108 B1 | 9/2002 | Rosenberg et al. ......... 709/203 |
| 2003/0070170 A1 | 4/2003 | Lennon |
| 2003/0106065 A1 * | 6/2003 | Sakai et al. .................. 725/91 |
| 2006/0095939 A1 * | 5/2006 | Jutzi ........................... 725/78 |
| 2006/0156362 A1 * | 7/2006 | Perrot ....................... 725/110 |

* cited by examiner

*Primary Examiner*—Sanh D. Phu
(74) *Attorney, Agent, or Firm*—Cha & Reiter, L.L.C.

(57) ABSTRACT

In a digital broadcasting system comprising a server for retransmitting a digital broadcast on the basis of an Internet protocol (IP), a user terminal for receiving the digital broadcast on the basis of the IP, and a router for connecting the server with the user terminal, the server performs a method for providing the broadcasting channel information that includes the steps of dividing a broadcasting stream to be transmitted to the user terminal into the broadcasting channel information and other information excluding the broadcasting channel information by demultiplexing the broadcasting stream and extracting the broadcasting channel information from the divided broadcasting stream, converting the extracted broadcasting channel information into IP-based broadcasting channel information by inserting the Internet protocol information for each broadcasting channel into the extracted broadcasting channel information, and remultiplexing the IP-based converted broadcasting channel information and the other information and transmitting the remultiplexed information to the user terminal.

28 Claims, 7 Drawing Sheets

APPARATUS FOR PROVIDING BROADCASTING CHANNEL INFORMATION IN INTERNET PROTOCOL BASED DIGITAL BROADCASTING SYSTEM AND METHOD THEREOF

CLAIM OF PRIORITY

This application claims the benefit of the earlier filing date, pursuant to 35 § 119(e), to that patent application entitled "Apparatus for Providing Broadcasting Channel Information in Internet Protocol Based Digital Broadcasting System and Method Thereof" filed in the Korean Industrial Property Office on Dec. 11, 2004 and assigned Serial No. 2004-104658, the contents of which are hereby incorporated by reference.

BACKGROUND OF THE INVENTION

1. Field of the Invention

The present invention relates to an Internet protocol based digital broadcasting system, and more particularly to an apparatus for providing broadcasting channel information in an Internet protocol based digital broadcasting system and a method thereof.

2. Description of the Related Art

Presently, existing analog broadcasting services are being converted into digital broadcasting services while both analog and digital broadcasting services are provided side by side.

The digital broadcasting service, in this case, means a service for digital-processing and broadcasting video, audio and data (or content) that are provided through the analog broadcasting service. The digital broadcasting service can provide an image 5 to 6 times clearer than the corresponding analog broadcasting service and a sound having a quality ranging from compact disc sound to stereophonic sound. The standard of the digital broadcasting service may be classified into a DVB-MHP (Digital Video Broadcasting—Multimedia Home Platform) system in Europe and an ATSC (Advanced Television Systems Committee) system in North America. Also, there is a system independently implemented in Japan. Additionally, the digital broadcasting service may be classified into ground-wave, satellite-wave and cable digital broadcasting services according to its transmission method.

Meanwhile, the digital broadcasting service is also operable in an Internet protocol (hereinafter referred to as an "IP") based system, and at present, the digital broadcasting services are being provided to a large number of user terminals. For example, a user can view the digital broadcasts through his/her terminal having a specified IP address, which is not a general digital television receiver. In this case, the user terminal does not receive the digital broadcasting signal from a base station that directly transmits the digital broadcasting signal or a satellite, but rather receives the digital broadcasting signal from a server that receives and converts the digital broadcasting signal on the basis of IP, and retransmits the converted digital broadcasting signal.

Generally, the digital broadcasting service provides an MPEG-2 audio, video and data on the basis of ISO/IEC (International Organization for Standardization/International Electro-technical Commission) 13818-1 format, which is the MPEG-2 (Moving Picture Experts Group-2) system standard. In order to provide the audio, video and data, the digital broadcasting service may constitute independent elementary streams corresponding to the audio, video and data, and then construct transport streams by multiplexing at least one elementary stream.

Now, an electronic program guide (hereinafter referred to as an 'EPG') will be explained.

The transport streams (hereinafter used as the same meaning as 'broadcasting streams') formed as above are transmitted to user terminals through various networks and physical media. The EPG information, which includes information about the contents of diverse programs and the kinds of the programs, enables the user terminals to search for and receive the streams desired by the users among the transport streams transmitted to the user terminals. Accordingly, the EPG information may be included in the transport stream to be transmitted. Although the EPG information is referred to differently, it is provided in similar ways in Europe, North America and Japan.

FIG. 1 is a view illustrating the EPG information provided in a general digital broadcasting service.

As illustrated in FIG. 1, the EPG information is displayed on a screen, and is composed of a moving image region 110, a text region 120, a channel region 130, a time region and a program title region 150. Accordingly, the viewer can recognize when, and through which broadcasting channel, his/her desired program will be broadcast with reference to the EPG information shown. The viewer can decide the channel through viewing of a preview moving image for the corresponding program or the currently viewed moving image, or can recognize additional information about the corresponding image through viewing of the text region.

Meanwhile, respective broadcasting service providers that are providing digital broadcasting servers on their web sites are notifying the viewers of their own broadcasting schedules on their corresponding web sites. Accordingly, a viewer who intends to view a desired broadcasting channel may select the broadcasting channel by directly inputting an IP address that provides the described broadcasting schedule. However, this may be an inconvenience to the viewer. Additionally, whenever the broadcasting schedules are changed due to unavoidable circumstances, the broadcasting service providers may change the broadcasting schedules one by one. If the broadcasting service providers do not update the changed broadcasting information at appropriate times, the viewers cannot view their desired broadcasts.

Accordingly, it is preferable that the EPG information is provided in the digital broadcasting services that are retransmitted based on IP. However, it is impossible to directly apply the EPG information being provided in the existing digital broadcasting services to the IP-based digital broadcasting services as they are currently configured. This is because IP information (such as UP addresses, port numbers, streaming types (i.e., multicast or unicast), etc.) of streaming servers for receiving the corresponding broadcasting channels, i.e., digital broadcast retransmission servers, is not included in the EPG information being provided in the existing digital broadcasting services. Also, IP information for each broadcasting channel being broadcast from the digital broadcast retransmission server is not included in the EPG information.

SUMMARY OF THE INVENTION

Accordingly, the present invention has been designed to solve the above and other problems occurring in the prior art, and an object of the present invention is to provide an apparatus for providing improved EPG information when an IP-based digital broadcasting service is provided and a method thereof.

One aspect of the present invention is to provide an apparatus for providing EPG information in real time when an IP-based digital broadcasting service is provided and a method thereof.

Another aspect of the present invention is to provide an apparatus for dispersing loads of broadcast retransmission servers for providing an IP-based digital broadcasting service and a method thereof.

Another aspect of the present invention is to provide a first method for providing broadcasting channel information by a server in a digital broadcasting system in which the server retransmits a digital broadcast on the basis of an Internet protocol (IP), a user terminal for receiving the digital broadcast on the basis of the IP, and a router for connecting the server with the user terminal, the method comprises the steps of dividing a broadcasting stream to be transmitted to the user terminal into the broadcasting channel information and other information excluding the broadcasting channel information by demultiplexing the broadcasting stream, and extracting the broadcasting channel information from the divided broadcasting stream, converting the extracted broadcasting channel information into IP-based broadcasting channel information by inserting the Internet protocol information for each broadcasting channel into the extracted broadcasting channel information, and remultiplexing the IP-based converted broadcasting channel information and the other information and transmitting the remultiplexed information to the user terminal.

In another aspect of the present invention, there is provided a second method for receiving broadcasting channel information by a user terminal in a digital broadcasting system containing a server for retransmitting a digital broadcast on the basis of an Internet protocol (IP), the user terminal for receiving the digital broadcast on the basis of the IP, and a router for connecting the server with the user terminal, the second method comprises the steps of transmitting a multicast join message requesting an IP-based digital broadcasting service reception to the router, receiving Internet protocol information of the server in response to the multicast join message, requesting the broadcasting channel information to the server, and receiving the IP-based converted broadcasting channel information in response to the request.

In still another aspect of the present invention, there is provided a third method for transmitting/receiving broadcasting channel information performed between a server and a user terminal in a digital broadcasting system in which the server retransmits a digital broadcast on the basis of an Internet protocol (IP), the user terminal receiving the digital broadcast on the basis of the IP, and a router for connecting the server with the user terminal the method comprises the steps of the server transmitting a message including its own Internet protocol information to the router, the user terminal transmitting a multicast join message requesting an IP-based digital broadcasting service reception to the router, the user terminal receiving Internet protocol information of the server in response to the multicast join message, the user terminal requesting the broadcasting channel information of the server, and the server transmitting the IP-based converted broadcasting channel information in response to the request for the broadcasting channel information of the user terminal.

In still another aspect of the present invention, there is provided an apparatus for providing broadcasting channel information in a digital broadcasting system in which a server retransmitting a digital broadcast on the basis of an Internet protocol (IP), a user terminal for receiving the digital broadcast on the basis of the IP, and a router for connecting the server with the user terminal, the method comprises a channel information extractor for dividing a broadcasting stream to be transmitted to the user terminal into the broadcasting channel information and other information excluding the broadcasting channel information by demultiplexing the broadcasting stream, and extracting the broadcasting channel information from the divided broadcasting stream, a channel information converter for converting the extracted broadcasting channel information into IP-based broadcasting channel information by inserting the Internet protocol information for each broadcasting channel into the extracted broadcasting channel information, and a broadcasting stream remultiplexer for remultiplexing the IP-based converted broadcasting channel information and the other information and transmitting the remultiplexed information to the user terminal.

BRIEF DESCRIPTION OF THE DRAWINGS

The above features and advantages of the present invention will be more apparent from the following detailed description taken in conjunction with the accompanying drawings, in which.

DETAILED DESCRIPTION

Embodiments of the present invention will be described in detail hereinafter with reference to the accompanying drawings. For the purposes of clarity and simplicity, only parts necessary for understanding the operation of the present invention will be explained, but a detailed description of known functions and configurations incorporated herein will be omitted as it may obscure the subject matter of the present invention.

The present invention enables user terminals to recognize IP information of a retransmission server by multicasting the IP information of the server in a system that retransmits a digital broadcast on the basis of an Internet protocol (IP). Also, the present invention proposes a scheme for providing modified EPG information to be used in an IP-based digital broadcasting system in the case in which the user terminal requests an electronic program guide (EPG) information.

The digital broadcast retransmission server according to the present invention extracts the EPG information from a transport stream that includes the existing EPG information, and reconstructs the transport stream by including IP information for each broadcasting channel that is retransmitted by the server with the EPG information. Here, the EPG information obtained by adding the IP information for each broadcasting channel to the existing EPG information is called a modified EPG information. The modified EPG information may be included in the transport stream and multicast to the user terminal, or may be unicast when the user terminal requests the modified EPG information.

Presently, in the digital broadcasting service that is divided into a North American type, a European type and a Japanese type, the EPG information is included in the transport stream and then provided to the viewers. The present invention is applicable to all systems that provide digital broadcast retransmission service on the basis of an IP by including the EPG information in the transport stream.

Figure 1:
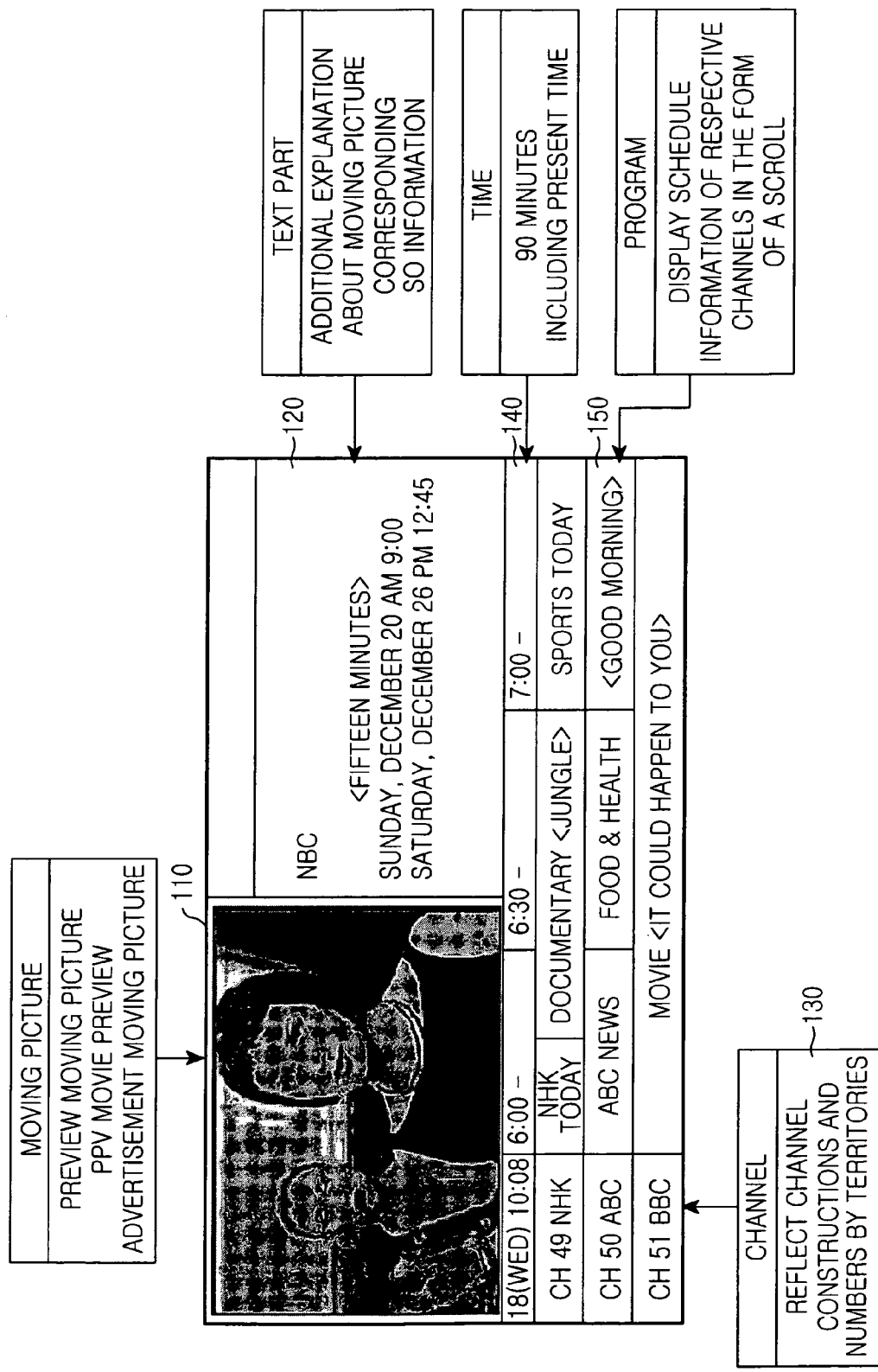
FIG. 1 is a view illustrating the EPG information provided in a general digital broadcasting service.
Figure 2:
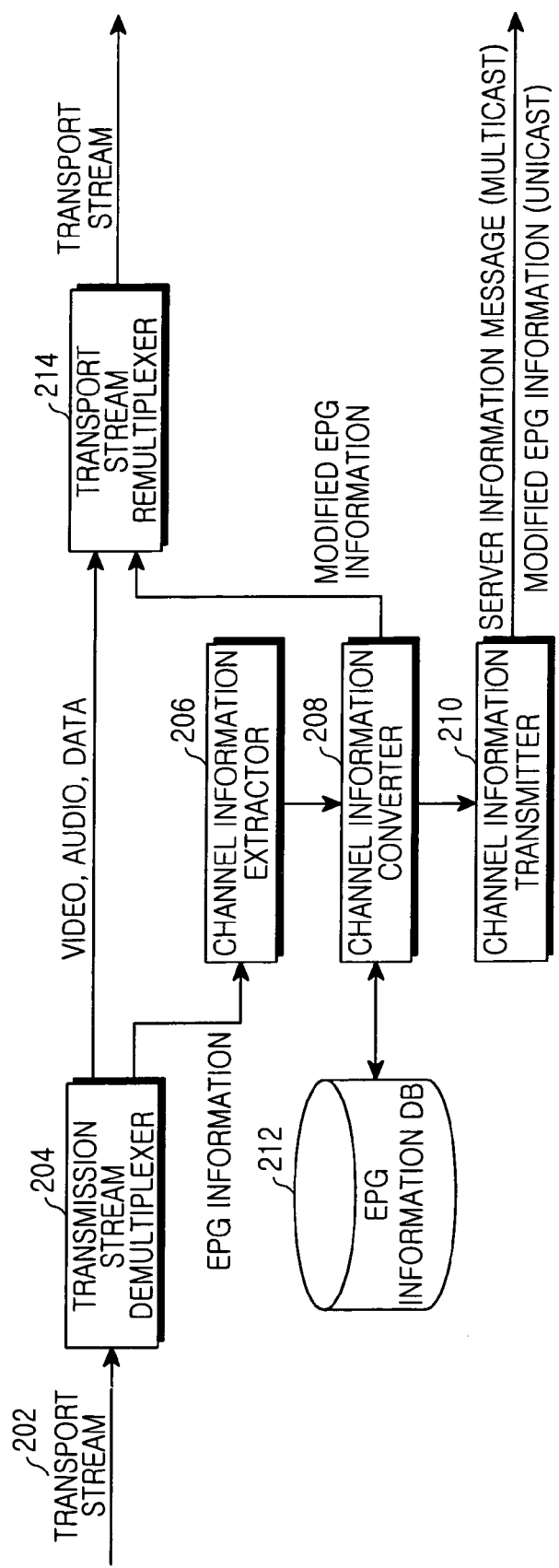
FIG. 2 is a view illustrating the construction of an IP-based digital broadcast retransmission server according to an embodiment of the present invention.

FIG. 2 is a view illustrating the construction of an IP-based digital broadcast retransmission server according to an embodiment of the present invention.

Before explaining the operation shown in FIG. 2, the video signal portion of the video, audio and data signals to be transmitted to a viewer is input to a video coder and the corresponding audio portion of the video, audio and data signals is input to a multiplexer after it passes through a specified coding process performed by an audio coder. The data signal is directly input to the multiplexer. Substantially simultaneously, the EPG-related information constructed in real time is also input to the multiplexer, and the multiplexer receives these signals and constructs the transport stream 202.

Referring to FIG. 2, the transport stream 202 as constituted above is demultiplexed into respective video, audio, data and EPG information by a transport stream demultiplexer 204. The EPG information is input to a channel information extractor 206 according to the present invention.

The demultiplexer 204 outputs the video, audio and data to a transport stream remultiplexer 214 as they are, but extracts and outputs the EPG information to the channel information extractor 206. The channel information extractor 206 outputs the extracted channel information a channel information converter 208. The channel information converter 208 includes the received EPG information in the IP information for each broadcasting channel provided by the EPG information database 212 to provide a modified EPG information, and outputs the modified EPG information to a channel information transmitter 210 and transport stream remultiplexer 214. In this case, at least one system for retransmitting digital broadcasts on the basis of the IP according to the present invention can share the modified EPG information by interworking the channel information converters 208 provided in the respective digital broadcast retransmission systems. Accordingly, the channel information converter 208 can collect the modified EPG information being provided to other digital broadcast retransmission systems. The collected EPG information is periodically or non-periodically stored in an EPG information database 212.

The transport stream remultiplexer 214 remultiplexes the video, audio, data and modified EPG information into an transport stream that is subsequently output.

Meanwhile, the channel information transmitter 210 periodically transmits the IP information that includes a server IP address and the port number of the digital broadcast retransmission server to multicast routers in the form of a multicast message. Additionally, the channel information transmitter 210, if it receives a modified EPG request message from the user terminal, may unicast the modified EPG information to the user terminal.

Figure 3:
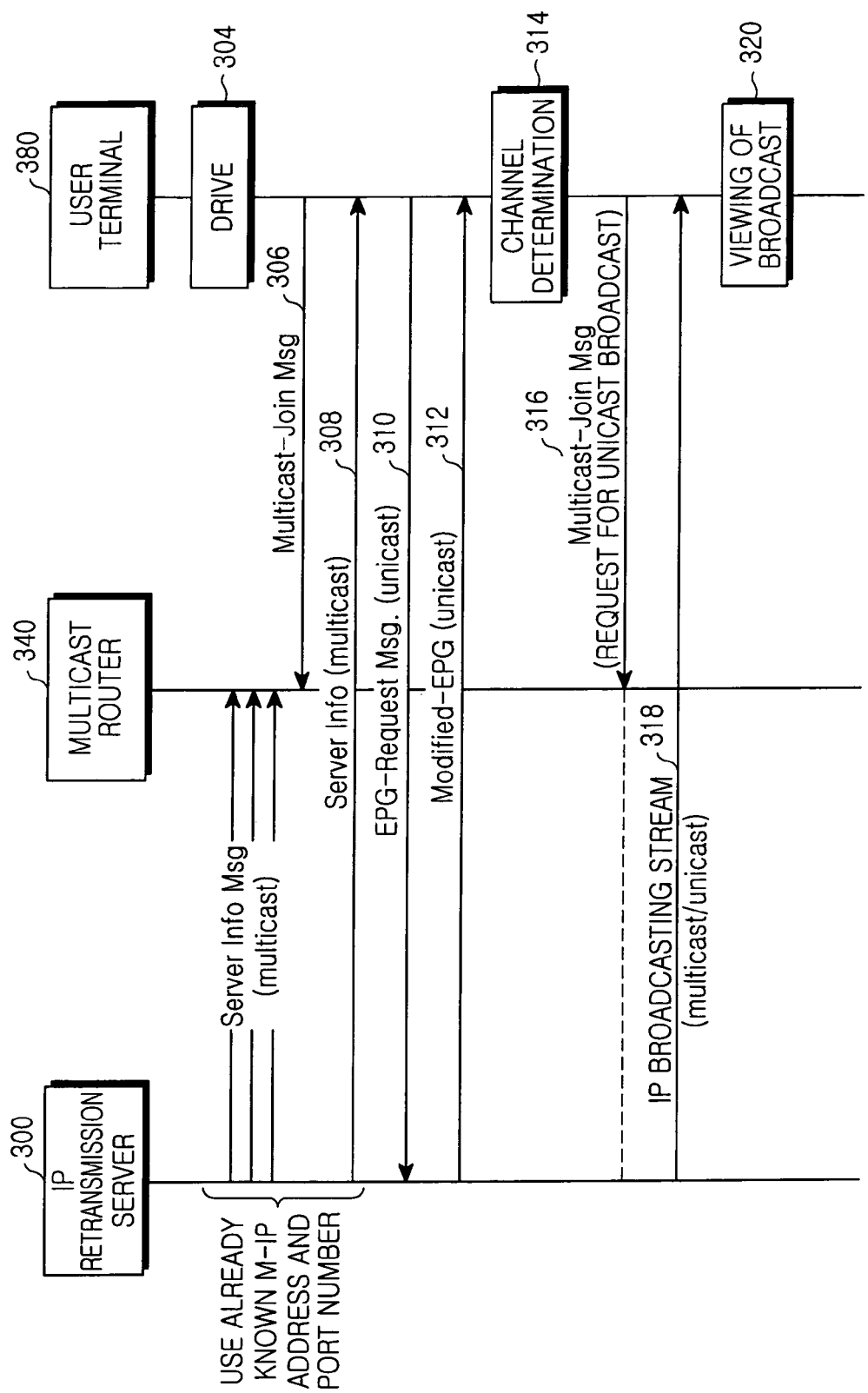
FIG. 3 is a flowchart illustrating an exemplary process between an IP retransmission server and a user terminal according to a first embodiment of the present invention.

FIG. 3 is a flowchart illustrating an exemplary process between the IP retransmission server and the user terminal according to the first embodiment of the present invention.

Referring to FIG. 3, an IP retransmission server 300 periodically transmits a multicast message that includes its own information (i.e., its IP address and the port number) to a multicast router 340 (step 302). Here, one IP retransmission server can perform communications with at least one multicast router located in its lower networks. Meanwhile, in the present invention, the multicast message is called a server information message Server Info Msg.

The user terminal 380 can receive the server information message (step 308) by joining a multicast group (step 306). Here, the user terminal 380 can join the multicast group by transmitting a multicast join message to the multicast router 340 to which the user terminal itself belongs. The user terminals that join the specified multicast group can receive all messages transmitted from the IP retransmission server 300 with reference to the multicast address corresponding to the specified group.

Then, the user terminal 380 that has obtained the information of the IP retransmission server 300 from the received server information message unicasts an EPG request message, "EPG request Msg," in accordance with the principles of the present invention to the IP retransmission server 300 (step 310). The IP retransmission server 300 transmits the modified EPG information to the user terminal 380 in response to the EPG information request (step 312).

Then, the user terminal 380 determines a desired broadcasting channel (step 314), and transmits a multicast join message that includes the IP information of the determined channel to the multicast router 340 to request the broadcasting of the corresponding broadcasting channel (step 316). The multicast router 340 informs the IP retransmission server 300 of the broadcasting request of the user terminal 380.

The IP retransmission server 300 transmits the IP broadcasting stream corresponding to the broadcasting channel requested by the user terminal 380 through the multicast router 340 (step 318) to the user terminal 380. The user terminal 380 can display the corresponding broadcast according to the reception of the broadcasting stream (step 320).

Meanwhile, if the quality of the broadcasting channel being received by the IP retransmission server (hereinafter referred to as a 'first IP retransmission server') deteriorates, the user terminal may receive the broadcast from another IP retransmission server (hereinafter referred to as a 'second IP retransmission server). In this case, the user terminal recognizes the IP information of the second IP retransmission server with reference to the modified EPG information received from the first IP retransmission server. Accordingly, the user terminal can receive the same broadcasting channel, which is being received from the first IP retransmission server, from the second IP retransmission server by transmitting the multicast join message to the second IP retransmission server.

Additionally, the user terminal may be a mobile user terminal. That is, the user terminal may move from the present network to another network. In this case, the IP address of the user terminal is changed according to the movement of the user terminal. However, the user terminal can receive the IP broadcasting stream by selecting the corresponding IP retransmission server from which it can receive the corresponding broadcasting stream according to the IP information of the IP retransmission servers already known with reference to the modified EPG information, and transmit the multicast join message to the selected IP retransmission server, so that it can receive the IP broadcasting stream.

Figure 4:
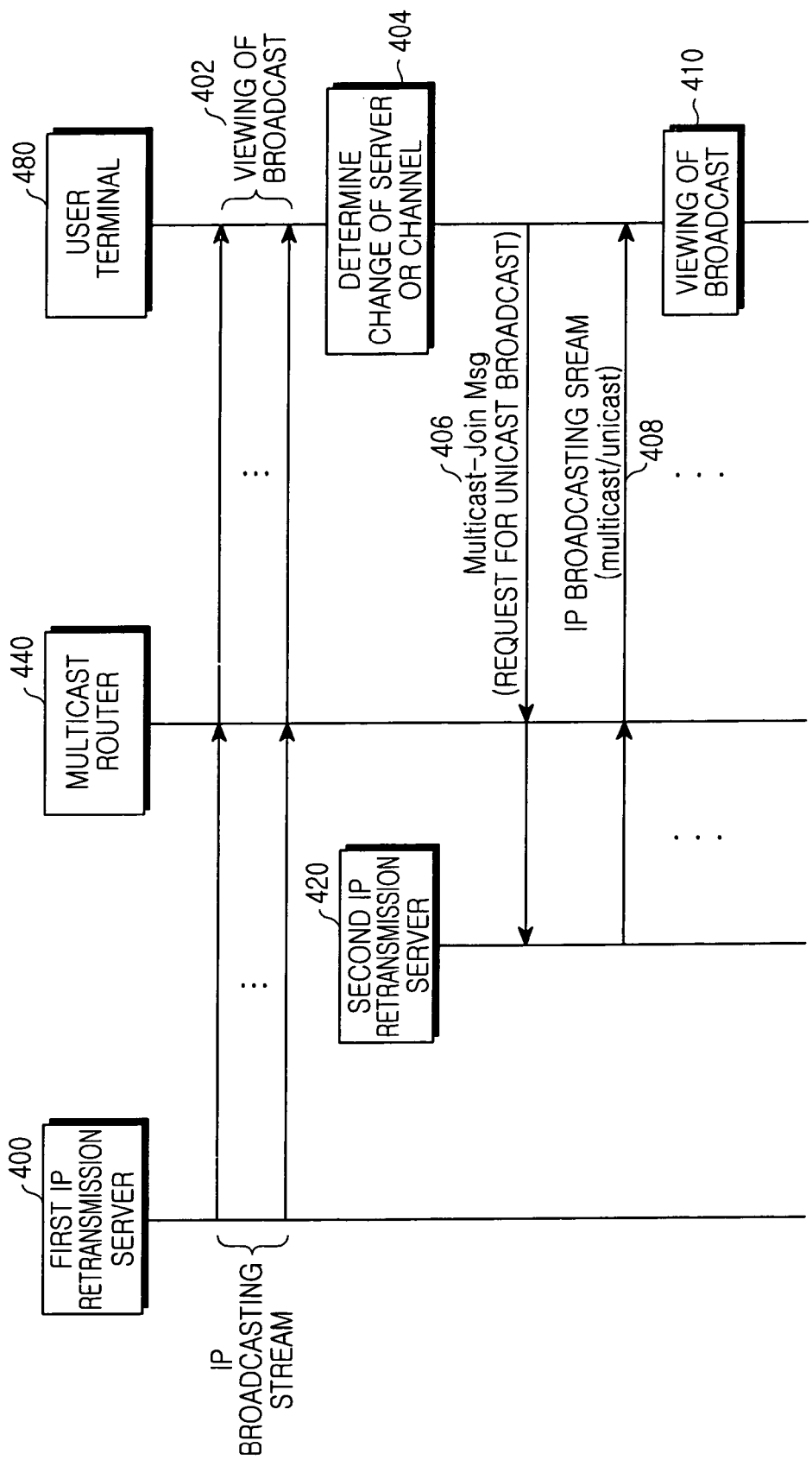
FIG. 4 is a flowchart illustrating an exemplary process between an IP retransmission server and a user terminal according to a second embodiment of the present invention.

FIG. 4 is a flowchart illustrating an exemplary process between the IP retransmission server and the user terminal according to the second embodiment of the present invention.

Referring to FIG. 4, the user terminal 480 is presently receiving the IP broadcasting stream from the first IP retransmission server 400 by performing the steps S302 to S318 of FIG. 3. Then, the user terminal 480 determines to change the server or the channel if the quality of the broadcasting channel deteriorates or the desired broadcasting channel does not exist among the broadcasting channels provided by the first IP retransmission server 400 (step 404). Here, the user terminal 480 may store IP information of all the multicast routers existing in the broadcasting system.

Accordingly, the user terminal 480 requests the transmission of the broadcasting channel to the second IP retransmission server 420 by transmitting the multicast join message to the second IP retransmission server 420 through a multicast router 440 (step 406). Here, the multicast router 440 may be a lower multicast router existing in another IP retransmission server. The second IP retransmission server 420 receives the message, and transmits the IP broadcasting stream to the user terminal 480 for the corresponding channel broadcasting (step 408). Meanwhile, before the step 408, the second IP retransmission server 420 may transmit its own EPG information to the user terminal. With the reception of the IP broadcasting stream, the user terminal can view the corresponding broadcast.

As described above, it is assumed that the first IP retransmission server and the second IP retransmission server broadcast the same channel, and the user terminals, the number of which approximates the limit of the server capacity, view the broadcast in the first IP retransmission server. In this case, the first IP retransmission server includes the IP information of the second IP retransmission server and the IP information for each channel in the modified EPG information and transmits the modified EPG information, so that the user terminals can view the corresponding broadcast from the second IP retransmission server. Accordingly, from the viewpoint of the whole system, the overload of a specified server can be prevented.

Additionally, in the case in which the user terminal cannot recognize the currently received broadcast and, thus, cannot view the broadcast, it can receive the corresponding broadcast from other IP retransmission servers.

Figure 5:
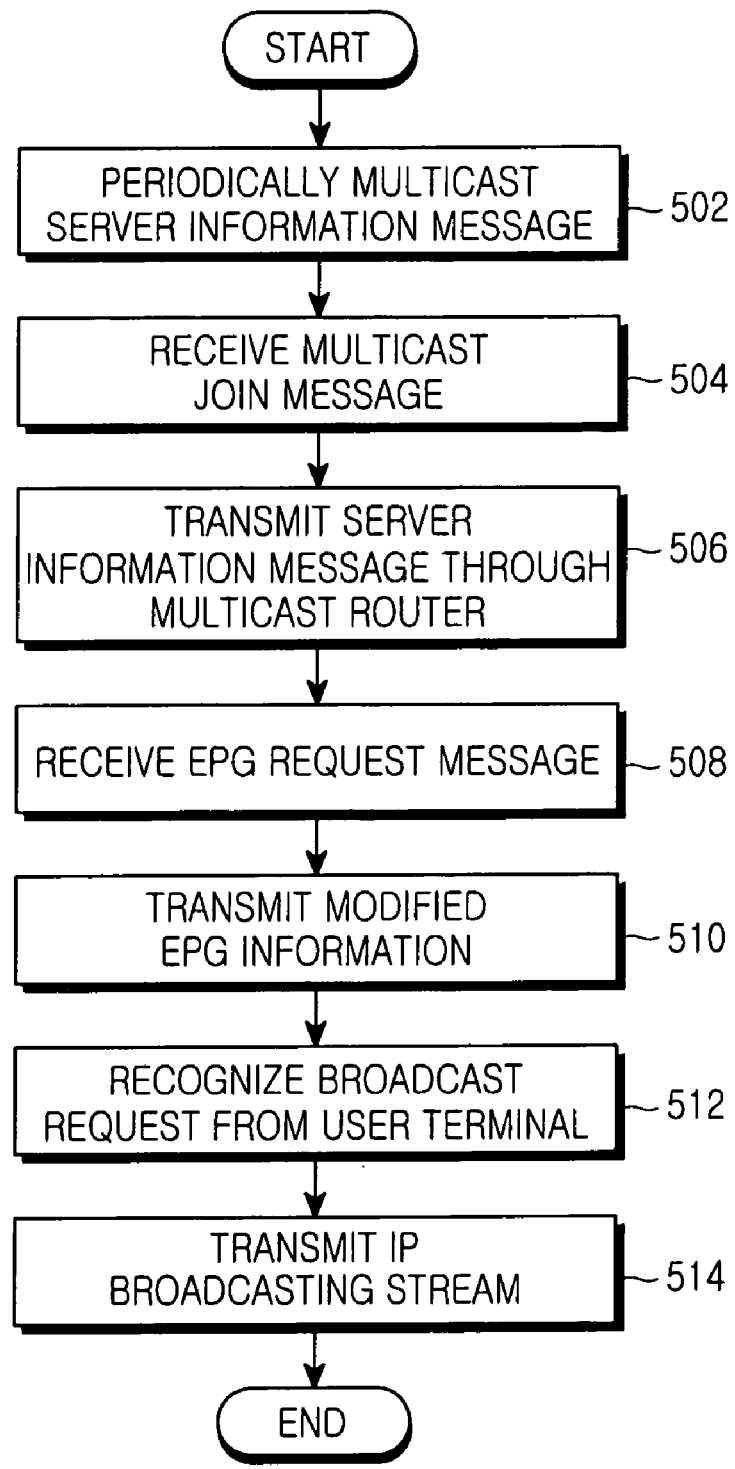
FIG. 5 is a flowchart illustrating an exemplary process of an IP retransmission server according to the first embodiment of the present invention.

FIG. 5 is a flowchart illustrating an exemplary process of the IP retransmission server according to the first embodiment of the present invention.

Referring to FIG. 5, the IP retransmission server periodically multicasts the server information message that includes its own server information to the multicast router at step 502. The IP retransmission server receives the multicast join message of the user terminal through the multicast router at step 504. The IP retransmission server transmits the server information message that includes its own IP address and the port number to the user terminal through the multicast router at step 506. Here, the server information message received by the user terminal may be a server information message previously stored in the multicast router.

The IP retransmission server receives the EPG request message from the user terminal at step 508. The IP retransmission server transmits the modified EPG information to the user at step 510. The IP retransmission server receives the multicast join message from the user terminal and recognizes the broadcast desired by the user terminal at step 512. The IP retransmission server transmits the IP broadcasting stream to the user terminal at step 514.

Figure 6:
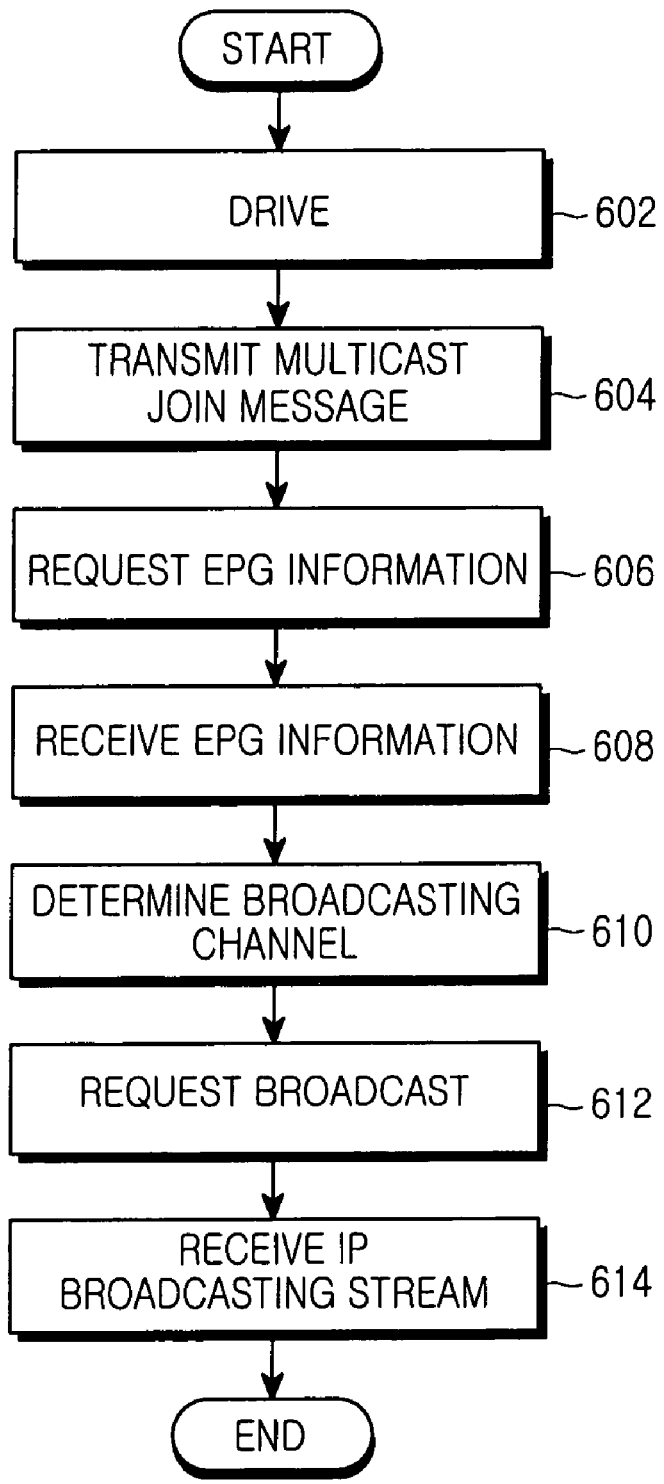
FIG. 6 is a flowchart illustrating an exemplary process of a user terminal according to the first embodiment of the present invention.

FIG. 6 is a flowchart illustrating an exemplary process of the user terminal according to the first embodiment of the present invention.

Referring to FIG. 6, the user terminal is operated according to Power On at step 602. The user terminal transmits the multicast join message to the multicast router at step 604. The user terminal requests the EPG information by transmitting the EPG request message to the IP retransmission server at step 606. The user terminal receives the modified EPG information from the IP retransmission server in response to the EPG request at step 608. The user terminal determines a desired broadcasting channel with reference to the modified EPG information at step 610. The user terminal requests the broadcast for the determined broadcasting channel by transmitting the multicast join message to the IP retransmission server at step 612. The user terminal receives the IP broadcasting stream from the IP retransmission server at step 614 and thus can view the corresponding broadcast.

Figure 7:
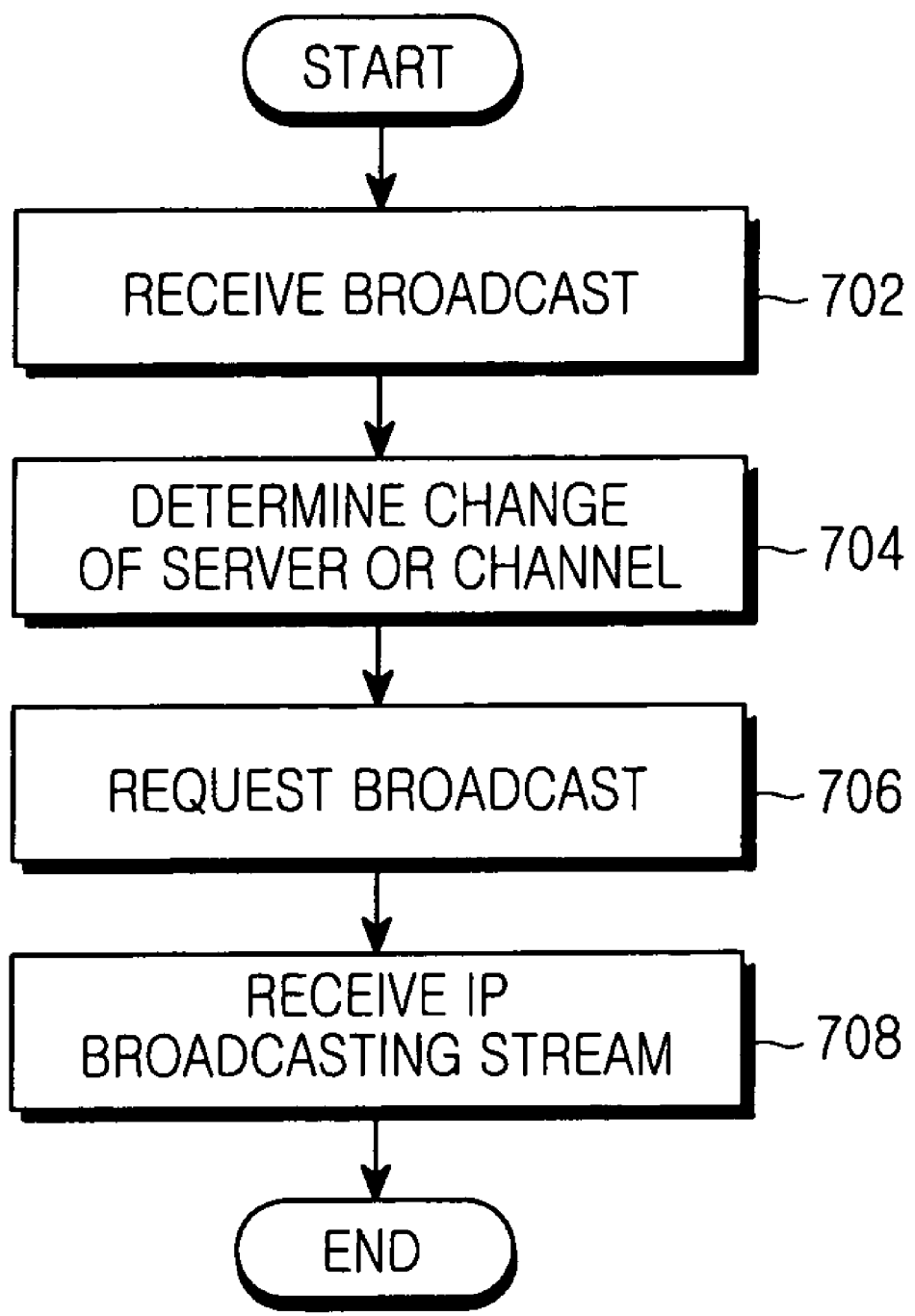
FIG. 7 is a flowchart illustrating an exemplary process of a user terminal according to the second embodiment of the present invention.

FIG. 7 is a flowchart illustrating an exemplary process of the user terminal according to the second embodiment of the present invention.

Refening to FIG. 7, the user terminal receives the broadcast from the first IP retransmission server at step 702. If the quality of the broadcasting channel deteriorates or the desired broadcasting channel does not exist among the broadcasting channels provided by the first IP retransmission server, the user terminal determines to change the server or the channel at step 704. The user terminal requests the transmission of the broadcasting channel by transmitting the multicast join message to the second IP retransmission server at step 706. The user terminal receives the IP broadcasting stream from the second IP retransmission server at step 708.

As described above, according to the present invention, the system for retransmitting the digital broadcast on the basis of an IP includes the modified EPG information including the IP information for each broadcasting channel in the transport stream to transmit the transport stream to the user terminal, and thus the user terminal can recognize the EPG information even in the IP-based broadcasting system. Additionally, the user terminal can receive the broadcast by connecting to a desired broadcasting server and thus the load of the user terminals can be dispersed in the whole broadcasting system.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for providing broadcasting channel information performed by a server in a digital broadcasting system comprising the server retransmits a digital broadcast on the basis of an Internet protocol (IP), a user terminal for receiving the digital broadcast on the basis of the IP, and a router for connecting the server with the user terminal, the method comprising the steps of:

dividing a broadcasting stream to be transmitted to the user terminal into the broadcasting channel information and other information excluding the broadcasting channel information by demultiplexing the broadcasting stream, and extracting the broadcasting channel information from the divided broadcasting stream;

converting the extracted broadcasting channel information into IP-based broadcasting channel information by inserting the Internet protocol information for each broadcasting channel into the extracted broadcasting channel information; and remultiplexing the IP-based converted broadcasting channel information and the other information arid transmitting the remultiplexed information to the user terminal.

2. The method as claimed in claim 1, wherein the server transmits the broadcasting channel information converted on the basis of the IP to the user terminal when the user terminal requests the converted broadcasting channel information.

3. The method as claimed in claim 1, wherein the server stores the converted broadcasting channel information.

4. The method as claimed in claim 3, wherein the server receives and stores the converted broadcasting channel information being provided from at least one other server.

5. The method as claimed in claim 1, further comprising the step of the server periodically multicasting a message that includes its own Internet protocol information to the router.

6. The method as claimed in claim 5, wherein the Internet protocol information of the server includes an Internet protocol address and a port number of the server.

7. The method as claimed in claim 1, wherein the Internet protocol information for each broadcasting channel includes an Internet protocol address and a port number of each broadcasting channel.

8. A method for receiving broadcasting channel information performed by a user terminal in a digital broadcasting system comprising a server for retransmitting a digital broadcast on the basis of an Internet protocol (IP), the user terminal for receiving the digital broadcast on the basis of the IP, and a router for connecting the server with the user terminal, the method comprising the steps of:

transmitting a multicast join message requesting an IP-based digital broadcasting service reception to the router;

receiving Internet protocol information of the server in response to the multicast join message;

requesting the broadcasting channel information of the server; and receiving the IP-based converted broadcasting channel information in response to the request, wherein the receiving step in response to the request comprises the steps of: dividing a broadcasting stream to be transmitted to the user terminal into the broadcasting channel information and other information excluding the broadcasting channel information by demultiplexing the broadcasting stream, and extracting the broadcasting channel information among the divided broadcasting stream; and converting the extracted broadcasting channel information into the IP-based broadcasting channel information by inserting Internet protocol information for each broadcasting channel into the extracted broadcasting channel information.

9. The method as claimed in claim 8, wherein the Internet protocol information of the server includes an Internet protocol address and a port number of the server.

10. The method as claimed in claim 8, wherein the broadcasting channel information converted on the basis of the IP includes Internet protocol information for each broadcasting channel provided by the server.

11. The method as claimed in claim 8, wherein the broadcasting channel information converted on the basis of the IP includes Internet protocol information for each broadcasting channel provided by at least one other servers.

12. The method as claimed in claim 8, further comprising the steps of:

reporting the broadcasting channel information to be received by transmitting a multicast join message to the server when a broadcasting channel to be received with reference to the received broadcasting channel information converted on the basis of the IP exists; and receiving an IP-based broadcasting stream of the corresponding broadcasting channel from the server.

13. The method as claimed in claim 12, wherein the IP-based broadcasting stream includes the broadcasting channel information IP-based converted by the server.

14. The method as claimed in claim 12, further comprising the steps of:

reporting a change of the server or the broadcasting channel by transmitting a multicast join message to the server intended to be changed or the server that provides the changed broadcasting channel; and receiving the IP-based broadcasting stream from the server that provides the broadcasting channel.

15. A method for transmitting/receiving broadcasting channel information performed between a server and a user terminal in a digital broadcasting system wherein the server retransmits a digital broadcast on the basis of an Internet protocol (IP), the user terminal receiving the digital broadcast on the basis of the IP, and a router for connecting the server with the user terminal, the method comprising the steps of:

transmitting a message, by the server to the router, the message including the server's Internet protocol information;

transmitting a multicast join message by the user terminal to the router the message requesting an IP-based digital broadcasting service reception;

receiving Internet protocol information of the server in response to the multicast join message by the user terminal;

requesting the broadcasting channel information by the user terminal to the server; and transmitting, by the server, an IP-based converted broadcasting channel information in response to the request for the broadcasting channel information, wherein the transmitting step by the server comprises the steps of: dividing a broadcasting stream to be transmitted to the user terminal into the broadcasting channel information and other information excluding the broadcasting channel information by demultiplexing the broadcasting stream, and extracting the broadcasting channel information among the divided broadcasting stream; and converting the extracted broadcasting channel information into the IP-based broadcasting channel information by inserting Internet protocol information for each broadcasting channel into the extracted broadcasting channel information.

16. The method as claimed in claim 15, further comprising the step of remultiplexing the IP-based converted broadcasting channel information along with the other information and transmitting the remultiplexed information to the user terminal.

17. The method as claimed in claim 15, wherein the server stores the converted broadcasting channel information.

18. The method as claimed in claim 17, wherein the converted broadcasting channel information stored in the server includes broadcasting channel information provided from at least one other server.

19. The method as claimed in claim 15, wherein the Internet protocol information of the server includes an Internet protocol address and a port number of the server.

20. The method as claimed in claim 15, wherein the Internet protocol information for each broadcasting channel includes an Internet protocol address and a port number of each broadcasting channel.

21. The method as claimed in claim 15, further comprising the steps of:
   reporting information about a requested broadcasting channel change by transmitting a multicast join message to the server; and
   the user terminal receiving the IP-based broadcasting stream of the corresponding broadcasting channel from the server.

22. The method as claimed in claim 21, further comprising the steps of:
   reporting, by the user terminal, a change of the server or the broadcasting channel by transmitting the multicast join message to the server intended to be changed or the server that provides the changed broadcasting channel when it is required for the user terminal to change the server or the broadcasting channel,; and
   the user terminal receiving the IP-based broadcasting stream from the server that provides the broadcasting channel.

23. The method as claimed in claim 22, wherein the change of the server or the broadcasting channel is made with reference to a table that includes Internet protocol address and port information of all routers existing in the IP-based broadcasting system.

24. An apparatus for providing broadcasting channel information in a digital broadcasting system comprising a server for retransmitting a digital broadcast on the basis of an Internet protocol (IP), a user terminal for receiving the digital broadcast on the basis of the IP, and a router for connecting the server with the user terminal, the apparatus comprising:
   a channel information extractor for dividing a broadcasting stream to be transmitted to the user terminal into the broadcasting channel information and other information excluding the broadcasting channel information by demultiplexing the broadcasting stream, and extracting the broadcasting channel information from the divided broadcasting stream;
   a channel information converter for converting the extracted broadcasting channel information into IP-based broadcasting channel information by inserting the Internet protocol information for each broadcasting channel into the extracted broadcasting channel information; and
   a broadcasting stream remultiplexer for remultiplexing the IP-based convened broadcasting channel information and the other information and transmitting the remultiplexed information to the user terminal.

25. The apparatus as claimed in claim 24, further comprising:
   a channel information transmitter for transmitting the broadcasting channel information converted by the channel information converter to the user terminal when the user terminal requests the converted broadcasting channel information; and
   a memory for storing the converted broadcasting channel information under the control of the channel information converter.

26. The apparatus as claimed in claim 25, wherein the channel information transmitter periodically multicasts a message that includes the Internet protocol information of the server to a plurality of routers.

27. The apparatus as claimed in claim 26, wherein the Internet protocol information of the server includes Internet protocol address and port number information of the server.

28. The apparatus as claimed in claim 24, wherein the Internet protocol information for each broadcasting channel includes Internet protocol address and port number information for each broadcasting channel.

* * * * *